(12) United States Patent
Dautremont et al.

(10) Patent No.: US 8,293,308 B2
(45) Date of Patent: *Oct. 23, 2012

(54) PRODUCTION OF EDIBLE WAFERS BY EXTRUSION

(75) Inventors: Christophe Dautremont, Oye Et Pallet (FR); Rodolfo De Acutis, Rawcliffe York (GB); Hugo Piguet, Cottens (CH)

(73) Assignee: Nestec S.A., Vevey (CH)

( * ) Notice: Subject to any disclaimer, the term of this patent is extended or adjusted under 35 U.S.C. 154(b) by 353 days.

This patent is subject to a terminal disclaimer.

(21) Appl. No.: 12/440,168

(22) PCT Filed: Sep. 10, 2007

(86) PCT No.: PCT/EP2007/059469
§ 371 (c)(1),
(2), (4) Date: Mar. 5, 2009

(87) PCT Pub. No.: WO2008/031796
PCT Pub. Date: Mar. 20, 2008

(65) Prior Publication Data
US 2009/0317524 A1    Dec. 24, 2009

(30) Foreign Application Priority Data
Sep. 11, 2006   (EP) ..................................... 06018976

(51) Int. Cl.
*A23P 1/12*   (2006.01)
(52) U.S. Cl. ........ 426/560; 426/661; 426/448; 426/449; 426/502; 426/503; 426/516; 426/517; 426/523; 426/808

(58) Field of Classification Search .................. 426/560, 426/451, 465, 502, 512, 516, 517, 523, 661, 426/448, 449, 503, 808
See application file for complete search history.

(56) References Cited

U.S. PATENT DOCUMENTS

| | | | | | |
|---|---|---|---|---|---|
| 1,975,326 | A | * | 10/1934 | Loose et al. | 426/275 |
| 2,613,620 | A | * | 10/1952 | Allen | 426/502 |
| 2,888,887 | A | * | 6/1959 | Wolf | 426/275 |
| 3,447,931 | A | * | 6/1969 | Benson et al. | 426/559 |
| 3,448,696 | A | * | 6/1969 | Verhoeven | 426/503 |
| 3,991,220 | A | * | 11/1976 | Gunther | 426/502 |

(Continued)

FOREIGN PATENT DOCUMENTS

DE     3128109     2/1983

(Continued)

OTHER PUBLICATIONS

International Search Report for International Application No. PCT/EP2007/059469 mailed on Jul. 2, 2008.

(Continued)

*Primary Examiner* — Drew E Becker
(74) *Attorney, Agent, or Firm* — K&L Gates LLP

(57) ABSTRACT

A method for producing wafers by extrusion comprising the steps of a. Preparing an ingredient mix b. Feeding the mix in an extruder and cooking the mix c. Extruding the cooked mix such that an extruded and expanded non-planar structure is formed d. Unfolding the structure to give a large extruded sheet e. Subjecting the extruded sheet to stretching/pulling f. Adjusting the sheet in order to obtain a desired thickness g. Drying the sheet h. Separating the sheet into wafers of desired dimensions The invention also relates to the wafers thus produced and to a wafer production line.

16 Claims, 3 Drawing Sheets

U.S. PATENT DOCUMENTS

Figure 1:
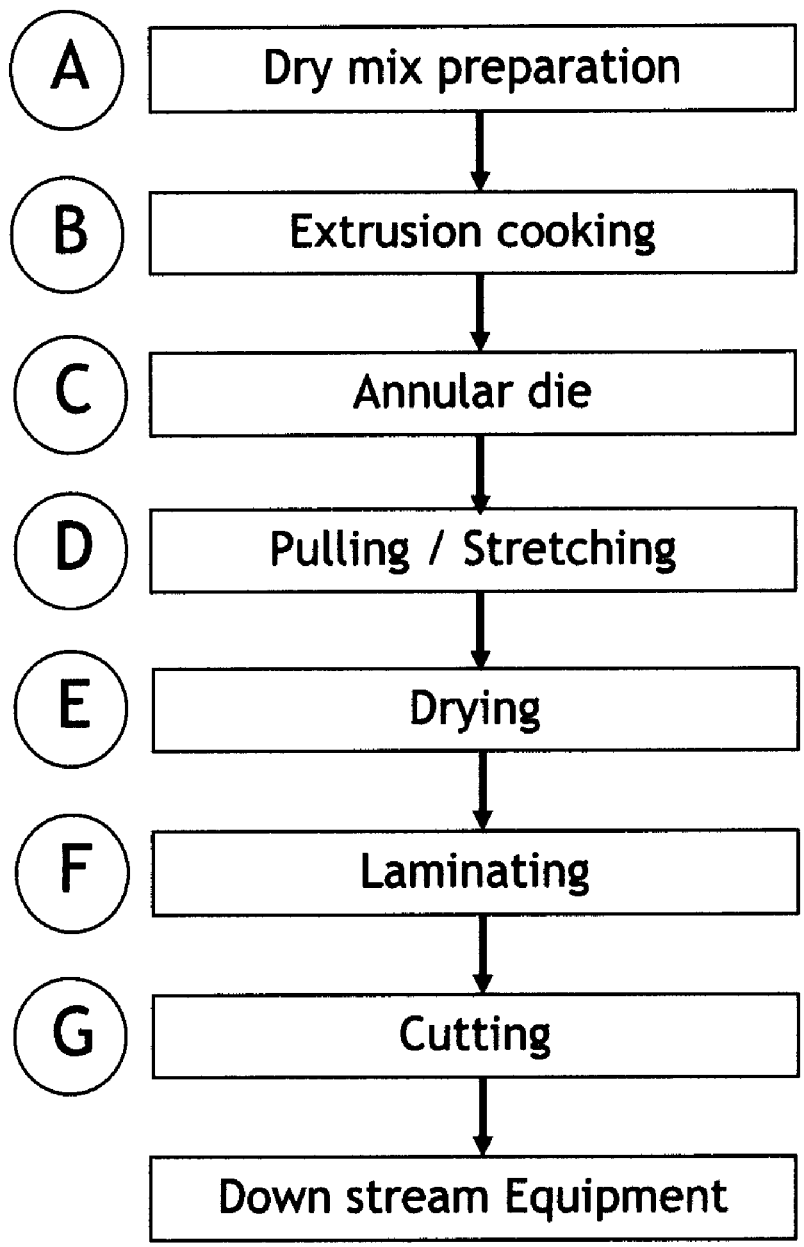

| | | | |
|---|---|---|---|
| 4,205,091 A * | 5/1980 | Van Horne | 426/138 |
| 4,217,083 A | 8/1980 | Machuque | |
| 5,063,068 A * | 11/1991 | Cavanagh | 426/94 |
| 5,077,074 A | 12/1991 | Van Lengerich | |
| 5,124,161 A * | 6/1992 | van Lengerich et al. | 426/94 |
| 5,196,223 A * | 3/1993 | Nakamura | 426/503 |
| 5,425,959 A | 6/1995 | Manser | |
| 5,702,744 A * | 12/1997 | Palmers et al. | 426/242 |
| 5,795,607 A * | 8/1998 | Haas et al. | 426/391 |
| 5,962,055 A | 10/1999 | Desjardins et al. | |
| 6,054,166 A | 4/2000 | Dupart | |
| 6,251,452 B1 | 6/2001 | Weinstein et al. | |
| 6,579,555 B1 | 6/2003 | Weinstein et al. | |
| 6,586,031 B1 | 7/2003 | Kelly | |
| 2001/0012528 A1 * | 8/2001 | Draganitsch et al. | 426/94 |
| 2003/0091698 A1 | 5/2003 | Marsland | |
| 2003/0091710 A1 * | 5/2003 | Bajema | 426/496 |
| 2007/0184162 A1 * | 8/2007 | Prestini | 426/502 |
| 2010/0037699 A1 * | 2/2010 | Dautremont et al. | 73/788 |

FOREIGN PATENT DOCUMENTS

| | | |
|---|---|---|
| DE | 3128109 A1 * | 2/1983 |
| EP | 1323347 | 2/2003 |
| EP | 1323347 A1 * | 7/2003 |
| FR | 946243 | 5/1949 |
| FR | 2783403 | 3/2000 |
| GB | 200432 | 7/1923 |
| GB | 2221603 | 2/1990 |
| WO | WO 9951111 | 10/1999 |
| WO | WO 0207538 | 1/2002 |

OTHER PUBLICATIONS

Written Opinion for International Application No. PCT/EP2007/059469 mailed on Jul. 2, 2008.

"Encyclopaedia of Food Science, Food Technology and Nutrition," by K.F. Tiefenbacher, pp. 417-20, Academic Press Ltd. London, 1993.

* cited by examiner

US 8,293,308 B2

PRODUCTION OF EDIBLE WAFERS BY EXTRUSION

FIELD OF THE INVENTION

The present invention relates to a process for producing edible wafers by extrusion, to the edible wafers thus obtainable and to a wafer production line.

BACKGROUND ART

Cereal-based foods may be manufactured by a variety of processes.

One category of cereal-based food is wafer. The main types of wafer are described by K. F. Tiefenbacher in "Encyclopaedia of Food Science, Food Technology and Nutrition p 417-420-Academic Press Ltd London—1993". Wafers can be baked as flat sheets between hot plates as described in GB2221603, or can be baked using shaped moulds into other shapes such as cups or ice cream cones (GB200432). Traditionally, such wafers are made by baking a batter comprising wheat flour, water, some fat, and a raising agent e.g. sodium bicarbonate.

Wafers with a composition that causes them to be flexible when hot can be shaped after baking, for example in the production of rolled wafer cones from a sugar-containing batter. Cereal compositions can also be extruded into narrow strips which are then formed into shapes such as cones (EP 1 323 347 A1).

Flat wafer sheets are used in a number of popular confectionery products such as KIT KAT. Typically the flat wafer sheets may have a fat cream layer applied to them and then several creamed sheets, together with a non-creamed top sheet, and are assembled to form a so-called "wafer book". The wafer books are cut into small biscuits which can be enrobed or moulded with chocolate.

Extrusion-cooking of cereal-based compositions is commonly used in the food industry. It is described for the preparation of edible food product cups in U.S. Pat. No. 5,962,055, in the making of multiple, complexly patterned extrudates in U.S. Pat. No. 6,251,452 B1, in the manufacture of confectionery having coloured fine line (U.S. Pat. No. 6,579,555 B1), and also in the manufacture of expanded shaped pellets in U.S. Pat. No. 6,586,031 B1. U.S. Pat. No. 6,054,166 further describes a process for making cooked snack by extrusion having a texture similar to traditional tortillas, crisps, or crackers. US 2003/0091698 A1 describes a dough of high-protein food material composition which may be extruded into shape and then baked to form food products such as wafers, flat breads, and waffles. Bread slices or toasts produced by a baking-extrusion-expansion process are described in U.S. Pat. No. 4,217,083.

Dough compositions for making farinaceous snacks are disclosed in WO 99/51111 and WO 02/07538 A2 for instance. DE 31 28 109 A1 also discloses a method for making homogeneous dough strips by extrusion.

The common features of the extrusion processes include the step of forming an extrudable dough, which may be cooked in a single or a twin-screw extruder under high temperature, and which is then extruded through a die. Extrusion through a die may be accompanied by expansion, depending on the water content of the dough and depending on the pressure at the die. The product may then be cut and/or further processed and cooled.

The resulting products manufactured by the extrusion processes described above commonly have disadvantages such as inhomogeneous distribution of the obtained cereal-based product. These problems mean that it has not been possible to use extrusion to produce a uniform large flat wafer sheet, such as would be suitable for feeding a layering process for the production of wafer books.

It is thus an object of the invention to provide a process and a production line which overcome these disadvantages and further improve the efficiency of cereal-based flat wafer production.

SUMMARY OF THE INVENTION

Accordingly, this object is solved by the features of the independent claims. The dependent claims further develop the central idea of the invention.

Thus, in a first aspect, the invention provides a wafer production line comprising in the downstream direction:
  a. An extruder comprising a circular extrusion die capable of forming a non-planar extrudate
  b. A deflector for forming the extrudate into an extruded sheet
  c. A stretching/pulling unit for stretching/pulling a the extruded sheet
  d. A laminating unit for laminating the extruded sheet
  e. A drying unit for drying the extruded product
  f. A separating unit for separating the extruded product into pieces of desired dimensions.

In a second aspect, the invention provides for a method for producing wafers by extrusion comprising the steps of:
  a. Preparing an ingredient mix
  b. Feeding the mix in an extruder and cooking the mix
  c. Extruding the cooked mix such that an extruded and expanded non-planar structure is formed
  d. Unfolding the structure to give a large extruded sheet
  e. Subjecting the extruded sheet to stretching/pulling
  f. Adjusting the sheet in order to obtain a desired thickness
  g. Drying the sheet
  h. Separating the sheet into wafers of desired dimensions, e.g. by cutting.

A wafer obtainable by a process according to claims 8 to 21 also forms part of the invention.

In a final aspect, the present invention provides a wafer obtainable by stretching a continuous cereal-based or starch-based extruded sheet and subsequently cutting it to the desired size.

FIGURES

Figure 2:
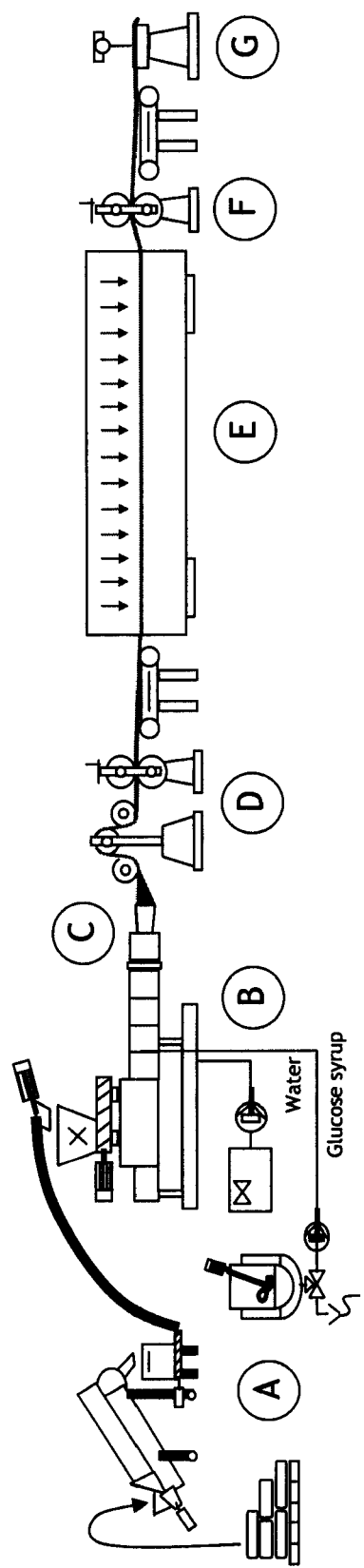
Figure 3:
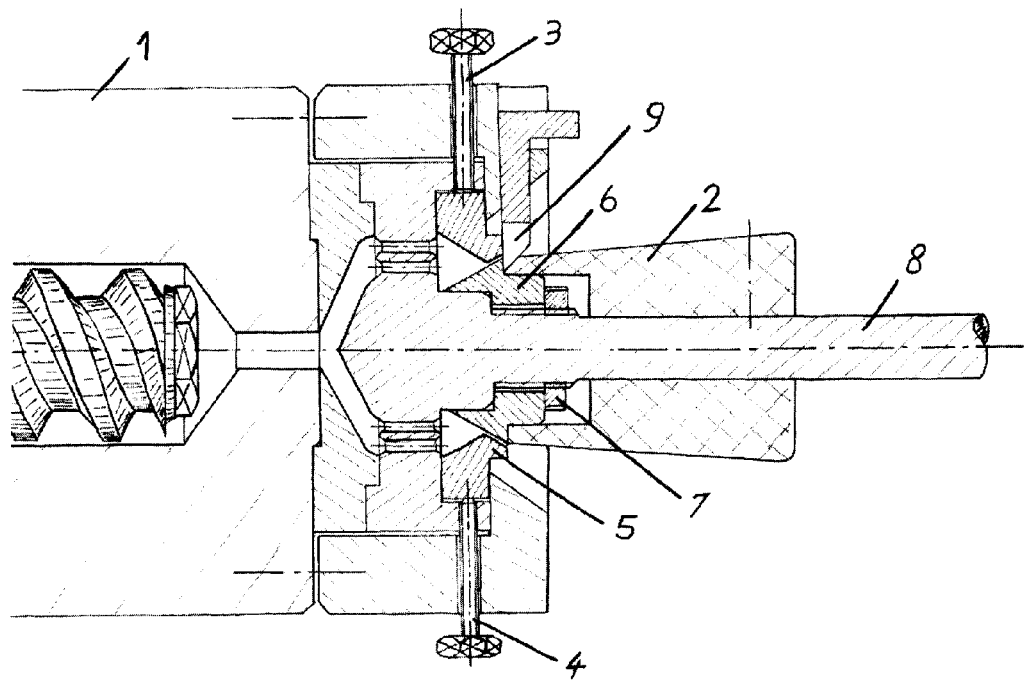
Figure 4:
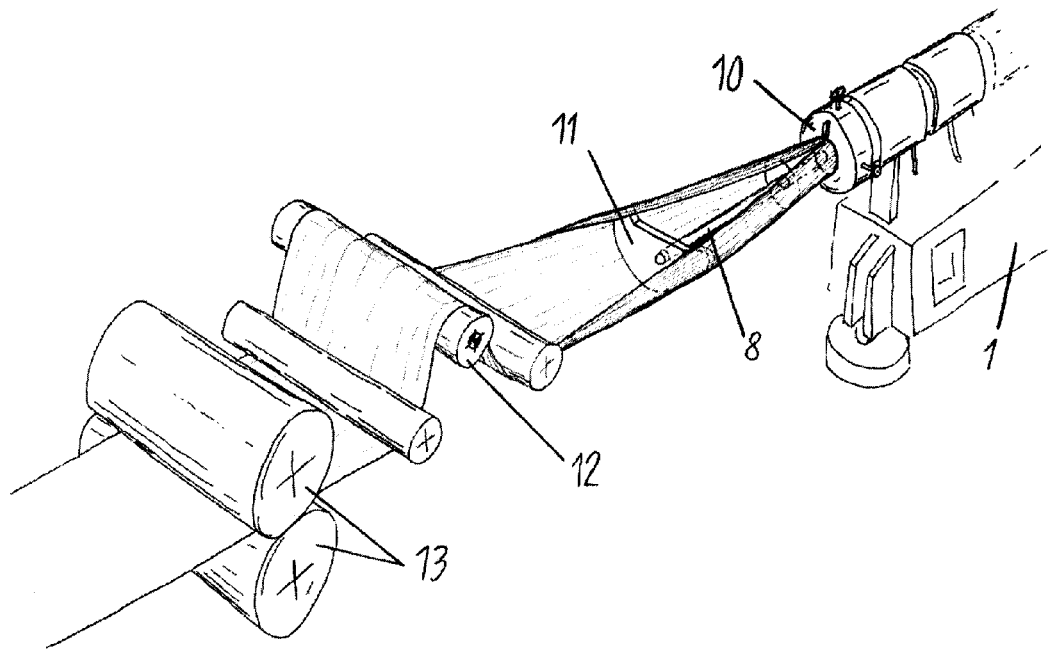

The present invention is described hereinafter with reference to some of its embodiments shown in the figures, wherein FIG. 1 is a chart showing steps in the process according to an embodiment of the invention, FIG. 2 depicts a wafer production line according to the invention, FIG. 3 depicts the end of the extruder, the die head, the blade, the plastic cone and the shaft according to a preferred embodiment of the invention, and FIG. 4 depicts an embodiment of part of the production line (the extruder, the circular die head, the unfolding of the tubular structure into a sheet, the deflector, stretching unit, pulling/laminating unit) according to the invention.

DETAILED DESCRIPTION OF THE INVENTION

In the present invention, the term "wafer" is to be understood as any cereal-based or starch-based edible product having a porous structure, delicate crisp texture, and thickness usually comprised between 0.5 and 4 mm, although the wafers of the present invention can go up to 10 mm or more. In cross section, the matrix of the wafer is highly aerated and primarily of gelatinized starch.

Referring to FIG. 1, the method of the invention consists in a first step in preparing an ingredient mix (FIG. 1A, FIG. 2A). The ingredient mix may be dry or moist. Preferably, the ingredient mix is cereal-based or starch-based.

The ingredient mix typically comprises 50-99% of cereal flour, from 0-50% sugar, 0.05-1.8% salt, 0-6% oil or fat and from 0 to 25% of added water. The cereal flour may be wheat, corn, barley, oats, rice, pea flour or combinations thereof, for example. The sugar may be selected from sucrose, invert syrup, fructose syrup, glucose syrup with various DE, maltodextrins with various DE etc. and combinations thereof.

The mix may also include other potential ingredients such as for example milk, milk powder, fruit powders, whole grain flours, cocoa powder, malt extract, bran (flour and/or bits), flavouring and/or colouring agents, leavening agents (typically in an amount of 0-1%), flour-improvers such as enzymes (typically in an amount of 0-0.02%), etc.

Also, the ingredient mix composition of the invention may further comprise pieces of edible material. Examples of such pieces can consist of parts of nuts, nut paste, almonds, sugar, chocolate, crunchy material, aerated material amongst others. It also includes seed husks which can be found in plain flour, for instance.

Accordingly, the present invention allows for a great variability in the recipe.

Thus, the mix may be prepared by first mixing powdery components to obtain a dry mix. The dry mix may be fed to the cooker-extruder as is, or it may be mixed together with liquid or fluid components, prior to entering the extruder.

After feeding the ingredient mix to the extruder, it may be further mixed in a first mixing section of a traditional food extruder, especially a twin screw extruder, for example. In a preferred embodiment, water (and/or steam) and/or a sugar solution and/or a fat solution may be injected in the extruder. This is preferably carried out at a low feed rate. The moisture in the extruder is typically between 10-25%. The water content of the mix at this stage preferably does not exceed 15%, more preferably it is between 5-15%.

The ingredient mix is then cooked in the extruder (FIG. 1B, FIG. 2B). Cooker extruders are continuous machines gathering several unit operations (conveying, mixing, melting/cooking, expanding, shaping) into one machine. Thus, according to the invention, the ingredient mix is fed and cooked in a twin, or single screw extruder with specific screw configuration and heating elements regulated to ensure a certain temperature profile.

Cooking the mixture may be carried out at 80 to 180° C., preferably from 130 to 170° C., under 8 to 15 MPa, for 5 to 50 s in subsequent sections of the extruder where the mixture is heated, compressed and sheared so that it forms a cooked thermoplastic mass. Preferably, the mean residence time is around 30 s. Under these conditions, the material melts due to the combination of mechanical friction between the screw(s) and the thermal energy given through the barrel. The melt is then conveyed to the die where it is subjected to pressure.

The thermoplastic mass may be extruded by having it pushed by the extruder screw or twin screw through the openings of a die provided for at the end of the extruder. As the die constitutes the final restriction at the outlet of the extruder, it has a chosen geometry which gives a defined shape to the product. According to the present invention, extrusion is carried out through a circular die (FIG. 1C, FIG. 2C). Circular dies are generally used in lasagna production. These offer the advantage that a homogenous flow distribution is ensured.

FIG. 3 is a schematic view of the end of the extruder and die, wherein (1) is the extruder, (3) and (4) are screws allowing the centring of parallel surfaces (5) and (6) called die lips, (7) is a nut needed to move the die lips, (8) is the shaft, (9) is the blade used to cut the extrudate structure such that the deflector placed at the end of the shaft (not shown) is able to shape the structure into a flat strip and (2) is a plastic cone used for radial expansion of the extruded product.

Thus, in the method of the invention, the cooked mix is extruded through a circular die such that a non-planar structure is formed (cf. FIG. 4). The non-planar structure is usually tubular or elliptical.

Furthermore, in cereal extrusion-cooking, when the water-containing extrudate, initially at high pressure and temperature, arrives at the die, water vaporises causing the extrudate to expand rapidly creating a bubbly foam structure. Traditionally the extruded product directly expands or puffs by the instantaneous conversion of compressed liquid vapour into steam as the product flows through the die and into an ambient environment (moisture flash off process). Using a circular die ensures that expansion occurs all around the die. Thus an expanded, extruded non-planar structure is produced (cf. FIG. 4).

Furthermore, using a circular die (FIG. 4—part 10) allows manufacturing an extrudate having a larger circumference and therefore a larger subsequent width than in traditional cereal-containing food extrusion processes. This may be aided by the presence of a plastic cone at the die exit (cf. FIG. 3, part 2), which creates a first radial stretching and makes the product preferentially expand in external radial directions. The cone further provides a gliding support for the extruded sheet as it comes out of the extruder. The ability to produce non-planar extrudates of such dimensions presents the advantage that the production line of the invention has a greater throughput of cereal-based or starch-based extruded material and is suitable for efficiently supplying flat wafers which may be used in layering processes such as, for example, in the production of wafer books.

The die head used in the present invention may be set up with a mechanical system using 4 screws (FIG. 3, parts 3,4) which allow the centring of parallel surfaces called die lips (FIG. 3, parts 5,6) during extrusion. By moving the internal lip of the die backward and forward using a nut (FIG. 3, part 7), the thickness of the product can also be changed during extrusion.

The next step in the process of the invention is the unfolding of the non-planar structure (shown in FIG. 4) to give a large extruded sheet.

By "large" is meant that said extruded sheet may be used for the production of a plurality of wafers. Thus, the large sheet may be cut lengthwise, i.e. in the direction of flow of the extruded sheet, and/or widthwise, i.e. perpendicularly to the flow of the extruded sheet. Typically, the large extruded sheet will have e.g. a width of at least 8 cm, preferably at least 15 cm, more preferably at least 20 cm, even more preferably more than 25 cm.

This unfolding of the extrudate into a sheet of extruded material is typically achieved with:

the use of a one-meter shaft (FIGS. 3 and 4—part 8) fixed on the die, which guides a movable cone (FIG. 3—part 2) that can be set right at the die's outlet. This plastic cone (FIG. 3—part 2) is used to maintain the product coming from the die, to create a first radial stretching and makes the product preferentially expand in external radial directions. By having a small blade (FIG. 3—part 9) and/or cutting wheel fixed at the exit of the die the product flow is separated or cut.

A second plastic deflector (FIG. 4—part 11) with defined shape fixed on the shaft (FIGS. 3 and 4—part 8) at 500 mm from the die is designed to open out the product from a non-planar structure to a flat strip. This deflector (FIG. 4, part 11) also helps to limit the recurrent geometrical issues occurring when developing the product from a circular cross section to a linear cross section. An example of such a recurrent geometrical issue could be warpage or inhomogeneous texture across the product strip.

The height difference between the die and the stretching/pulling unit is important in order to reduce the geometrical issues mentioned above. An optimum elevation of around 150 mm in the direction of the opening, from the central axis of the die and stretching/pulling unit has been determined. With the correct height difference, non-uniform stretching across the strip of product does not exceed 2%.

Thus, unfolding the non-planar structure yields a developed large strip of product. The width of the strip is at least 8 cm, preferably at least 15 cm, more preferably it is at least 20 cm, and even more preferably it is more than 25 cm. Once the product is in the form of a large flat strip, it is subjected to longitudinal stretching/pulling (FIG. 1D). A stretching unit (FIG. 4, part 12) will allow the product to be stretched longitudinally using a pulling force of about 0.1 to 80 N. Preferably, the stretching/pulling force is between 30 and 50 N. This process is carried out just after extrusion, while the product is still thermoplastic. Typically, the stretching/pulling is carried out through between 2 to 5 sets of consecutive smooth rolls (FIG. 4). Typically, the speeds of the stretching/pulling units may vary between 10 m/min and 50 m/min.

The extruded sheet, after being stretched and pulled, is adjusted in order to obtain a desired thickness. This is typically achieved by a laminating step (FIG. 2D). By lamination is meant the process of reducing the wafer thickness to form a thin layer such as by passing between rollers (cf. FIG. 4, part 13). The wafers produced can be essentially flat.

In this case, a pulling and laminating unit is used to drive the product from the die to line. It applies a certain longitudinal stretching to the product and reduces the thickness of it by an operation of lamination. The laminating and pulling unit is a set of rolls driven by motors with accurate speed control. The temperature of the rolls is controlled with a water circulation system in them, in order to avoid the product sticking.

In a preferred embodiment of the present invention, the extruded sheet is subjected to a second stretching/pulling step. The aim of this step is to enhance the thickness control. A low thickness (typically between 2 and 2.5 mm) is important in the production of thin wafers and also in order to avoid warpage. It thus allows the thickness to be further reduced in a very controlled way.

According to the invention, the stretched/pulled product may then be dried (FIG. 1E). Preferably, the drying step is carried out using an infra-red (IR) heater, or by hot-air drying. Typically, the product is placed on a mesh wire belt which goes through an IR drying machine (shown in FIG. 2E), such that infra-red radiations occur from above and below the product. The drying step typically reduces the water content of the product from about 15% to a moisture content of about 1 to 6.5%. Preferably, the wafer is dried to a final residual water content of from 1 to 4%, more preferably from 3-4%. Humidity conditioning of the product may be carried out, although this is not necessary.

In a preferred embodiment, a second laminating unit is used to control the thickness of the product at the exit of the dryer, while the product is still thermoplastic, and to ensure constant stretching in the longitudinal direction during the drying operation (cf. FIG. 1F). In this second laminating unit (shown in FIG. 2F), the temperature of the rolls is controlled with circulation of water in order to avoid the product sticking. The laminating units are important in controlling the thickness of the extruded sheet. Thickness is an important parameter which has an impact not only on the appearance of the final wafer product but also on the density thereof. The thickness of the sheet after lamination and prior to being cut is preferably between 0.5 and 10 mm, more preferably between 1-5 mm, more preferably between 1.5-3 mm.

Finally, the stretched/pulled extruded sheet is separated into a plurality of wafers of desired dimensions. Typically the separating step will be carried out with a guillotine-type cutter (FIG. 1G). To avoid any blockage and to ensure a good cut quality, the blade preferably has a circular motion with variable speed. The dimensions will vary widely depending on the applications. In any case, the large sheet will be used to produce a wide variety of wafer sizes for varied applications.

The wafers thus obtainable may further be cooled through an arch cooler.

The large extruded sheet obtainable by the process of the invention may also optionally be embossed by methods known to the skilled person or may be kept flat, depending on the desired application.

The process of the invention may be implemented by a wafer production line according to the invention. FIG. 2 depicts a production line whereby the letters correspond to the steps of the process as shown in FIG. 1.

Thus, according to an embodiment of the invention shown in FIG. 2, the wafer production line comprises, in the downstream direction an extruder (FIG. 2B) which may be fitted with a circular extrusion die (FIG. 2C). The end of the extruder and the circular die are shown in more details in FIG. 3 and in FIG. 4, part 10.

The extruder may be a single or twin screw extruder. The extruded product has a non-planar shape upon exiting the circular extrusion die. Thus, a deflector (FIG. 4, part 11) for shaping the extrudate into an extruded flat sheet is placed downstream from the extruder.

A stretching/pulling unit (FIG. 4, part 12) for stretching/pulling the product extruded by said extruder, is then placed at the die exit (after the deflector), followed by a laminating unit (FIG. 4, part 13 and FIG. 2D).

These units ensure that the extrudate is evenly stretched and will thus provide the end-product with improved texture characteristics.

A drying unit for drying the extruded product is located downstream from the laminating unit (FIG. 2E). The drying unit may be an infra-red drying unit or a hot air drying unit and ensures the product has the desired water content, preferably from 1-6.5%, more preferably from 1-4%, most preferably from 3-4%.

Optionally, a second stretching unit may be placed between the laminating unit and the drying unit.

An optional laminating unit for laminating the dried extruded product may also be present as shown in FIG. 2F. In a preferred embodiment, the wafer production line comprises a conveying belt (shown in FIG. 2, between part F and G) after the second laminating unit. This is to ensure a certain cooling time to make the product less thermoplastic for the separating (cutting) operation.

A separating unit for separating the extruded product into pieces of desired dimensions conclude the wafer production line of the invention. The separating unit (FIG. 2G) may be any type of cutter, e.g. guillotine cutter. It may be followed by a cooling unit, such that an arch cooler, for example, may be placed after the separating/cutting unit.

According to the invention, wafers may be obtained by the process described above, using the wafer production line of the invention.

The process of the invention presents many advantages. The use of a circular die in combination with the stretching/pulling unit confers to the products obtained advantages previously not possible using an extrusion process. The homogeneous flow distribution brought by the presence of a circular die on the extruded sheet gives a homogeneous product distribution of the extruded product. Furthermore, the texture of the end-product is notably improved by having an evenly stretched material, with a smooth surface. The minimisation of warpage further improves the processability of the extruded product. Furthermore, by the use of a circular die, the invention provides an extruded material with an unprecedented width. Thus, large extruded expanded wafer sheet are obtainable by the process of the invention. The efficiency of the production line is thereby increased.

The process of the invention has further advantages. Among them are a lower energy consumption, an easy change-over between products, less waste produced during production, flexibility in shape and an option for continuous process by using continuous wafer sheets instead of separated sheets.

In addition to wafers obtainable by the process described above, wafers obtainable by stretching and subsequently separating a cereal-based or starch-based extruded sheet also form part of the invention.

Applications for the wafers of the present invention, may include products to be consumed as such or products which form the basis for an edible product by sandwiching it with cream and/or coating it with, for example, a fat-based, sugar-based and/or chocolate coating etc. They may be used for ice-cream cones, biscuits, chocolate bars, confectionery products, savoury product, pet food etc. A preferred use is confectionery wafer bars. By using the process of the invention, it is possible to provide thin flat or embossed wafers having a porous, crispy, light texture dissolving rapidly in the mouth.

The wafers of the invention may have a thickness of 0.5 to 10 mm, preferably a thickness of 1 to 5 mm, more preferably a thickness of 1.5 to 3 mm.

Usually, flat wafers baked between conventional baking plates will not cleanly release from the plates unless they are baked to a low moisture content, typically below 1.5% moisture. Thus wafers, and especially wafers used for coated/moulded finished products containing wafers, have to be conditioned in a room having an atmosphere with controlled humidity until they reach the desired moisture content. If this conditioning process is not done or not properly done, the wafer, once coated, exchanges water with its environment which causes expansion and leads to cracks in the coating.

By using the extrusion process of the invention, it is possible to directly produce large flat wafer sheets at higher moisture contents. This removes the need for the conditioning step which is time and space consuming, and which therefore increases the final cost of the product.

Furthermore, in conventional wafers, wafer sheets having a defined and non-adaptable size are cut to obtain products of the desired size. If it is desired to change the size of the product being produced these changes are limited by the need to maximize the usage of the full wafer sheet. Wafer material which remains after the desired wafer sizes are cut from the sheet and must be re-worked, which reduces throughput and increases cost. Re-equipping a wafer baking oven with baking plates of a different size is expensive. With the wafer and process of the invention, when a change in the size of the wafer is desired, changing the die is very easy and cost efficient.

Another advantage of the wafer according to the present invention is that the wafer can be fat-free, which is important to the calorie-conscious consumers. In conventional wafers, the batter contains some fat in order to allow the demoulding of the wafer sheet from the wafer plates (moulds). The wafer of the invention is extruded and it does not need fat, although it may contain some if desired.

The extruded expanded cereal-based wafer product of the invention can be characterised by its cross-section. For instance, it may be characterised in that it is made from a stretched material. Indeed, the process for making the wafer, in particular stretching the extruded material results in the cells and the channels of the wafer being more elongated. This property of the internal structure impacts on the texture of the wafer which is porous, crispy, melting or has a light texture that dissolves rapidly in the mouth.

The present invention is further illustrated below by way of non-limiting examples.

EXAMPLES

Extrusion Process

A dry mix (moisture around 10%) is placed in an extruder. It enters into an Archimedean screw or double screws which are surrounded by thermostated jackets (barrels), and water is injected at a relative low feed rate (total moisture into the machine is usually between 15-25%). Other ingredients such as fat, sugar solution water and/or steam may also be injected. The material starts to melt due to the combination of mechanical friction between the screw(s) and raw material within the screw and thermal energy given through the barrel. The melt is conveyed towards the die where it is put under pressure. Typical conditions are 130-170° C., 8-15 MPa and mean residence time around 30 seconds. The product passes through the die where it can be shaped.

Composition

A typical composition of the invention is given in the table below.

| | % |
|---|---|
| Dry mix | |
| Wheat flour | 90 |
| Salt | 0.2 |
| Leavening agents | 0.3 |
| Injected ingredients | |
| Glucose syrup | 4 |
| Liquid fat | 0.5 |
| Water | 5 |

The invention claimed is:
1. A method for producing edible wafers by extrusion, the method comprising:
   a. preparing an ingredient mix;
   b. feeding the ingredient mix in an extruder and cooking the ingredient mix;
   c. extruding the cooked mix such that an extruded and expanded non-planar structure is formed;

d. unfolding the structure using a deflector to provide a large extruded sheet having a width of at least about 8 cm;
e. subjecting the extruded sheet to stretching with a stretching/pulling unit;
f. adjusting, with a laminating unit, the sheet in order to obtain a desired thickness;
g. drying the sheet; and
h. separating the sheet into wafers of desired dimensions.

2. The method of claim 1, wherein the ingredient mix is selected from the group consisting of cereal-based and starch-based.

3. The method of claim 1, wherein an ingredient selected from the group consisting of a sugar solution, a fat solution and water are injected in the extruder in step b.

4. The method of claim 1, wherein the water content of the mix in step b is less than or equal to 15%.

5. The method of claim 1, wherein the extrusion of step c is performed through a circular die.

6. The method of claim 1, wherein a structure selected from the group consisting of a tubular and an elliptical structure is formed in step c.

7. The method of claim 1, wherein a second stretching of the extruded product is performed after step f.

8. The method of claim 1, wherein the drying step is performed using a step selected from the group consisting of infra-red heating and hot air drying.

9. The method of claim 1, wherein the drying step reduces the moisture content of the sheet to 1-6.5%.

10. The method of claim 1, wherein a second laminating step is performed after the drying step.

11. The method of claim 1, wherein the extruded sheet after step f and before step h has a thickness of 0.5-10 mm.

12. The method of claim 1, wherein the extruded sheet has a structure selected from the group consisting of flat and embossed.

13. The method of claim 1, wherein the separation of the extruded sheet yields a plurality of wafers.

14. The method of claim 1, wherein the circular die has an exit through which the extruded and expanded non-planar structure travels, a cone at the exit performing a radial stretching of the extruded and expanded non-planar structure after step c and before step d.

15. The method of claim 1, wherein the stretching/pulling unit subjects the extruded sheet to stretching before the laminating unit performs the adjusting of the sheet to obtain a desired thickness.

16. The method of claim 1, wherein the drying of the sheet step is before the step of separating the sheet into wafers of desired dimensions.

* * * * *